United States Patent
Combs et al.

(10) Patent No.: US 9,367,317 B2
(45) Date of Patent: Jun. 14, 2016

(54) LOOP STREAMING DETECTOR FOR STANDARD AND COMPLEX INSTRUCTION TYPES

(71) Applicants: Jonathan D. Combs, Austin, TX (US); Jonathan Y. Tong, Austin, TX (US)

(72) Inventors: Jonathan D. Combs, Austin, TX (US); Jonathan Y. Tong, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 545 days.

(21) Appl. No.: 13/935,363

(22) Filed: Jul. 3, 2013

(65) Prior Publication Data

US 2015/0012726 A1    Jan. 8, 2015

(51) Int. Cl.
| | |
|---|---|
| *G06F 9/30* | (2006.01) |
| *G06F 9/40* | (2006.01) |
| *G06F 9/32* | (2006.01) |
| *G06F 9/38* | (2006.01) |

(52) U.S. Cl.
CPC ............ *G06F 9/30145* (2013.01); *G06F 9/325* (2013.01); *G06F 9/381* (2013.01); *G06F 9/3822* (2013.01)

(58) Field of Classification Search
None
See application file for complete search history.

(56) References Cited

U.S. PATENT DOCUMENTS

| | | | | |
|---|---|---|---|---|
| 5,450,555 A * | 9/1995 | Brown, III | ............ | G06F 9/3848 712/218 |
| 5,488,730 A * | 1/1996 | Brown, III | ............ | G06F 9/3848 712/217 |
| 5,751,981 A * | 5/1998 | Witt | .................... | G06F 9/30014 711/201 |
| 5,757,295 A * | 5/1998 | Bakhmutsky | ......... | H03M 7/425 341/100 |
| 6,094,716 A * | 7/2000 | Witt | .................... | G06F 9/30032 712/215 |
| 6,240,503 B1 * | 5/2001 | Witt | .................... | G06F 9/30101 711/200 |
| 6,378,061 B1 * | 4/2002 | Carbine | ................ | G06F 9/3017 712/200 |

* cited by examiner

*Primary Examiner* — Michael Sun
(74) *Attorney, Agent, or Firm* — Lowenstein Sandler LLP

(57) ABSTRACT

A processor includes a microcode storage comprising a plurality of microcode flows and a decode logic coupled to the microcode storage. The decode logic is configured to receive a first instruction, decode the first instruction into an entry point vector to a first microcode flow in the microcode storage, the entry point vector comprising a first indicator specifying a number of clock cycles associated with the first microcode flow, initiate the microcode storage, wherein the microcode storage inserts microinstructions of the first microcode flow into an instruction queue, count clock cycles after initiating the microcode storage, and decode a second instruction without first receiving a return from the microcode storage, wherein the second instruction is decoded at a particular clock cycle based on the number of clock cycles associated with the first microcode flow.

20 Claims, 12 Drawing Sheets

LOOP STREAMING DETECTOR FOR STANDARD AND COMPLEX INSTRUCTION TYPES

TECHNICAL FIELD

Embodiments described herein generally relate to the field of processors, processing logic, microprocessors, and associated instruction set architecture, and in particular to microcode used within processors, processing logic and microprocessors.

BACKGROUND

Certain processors, and other instruction execution apparatuses, conventionally implement higher-level machine instructions as lower-level microinstructions or micro-operations. A decoder decodes macroinstructions into either microinstructions or entry point vectors to a microcode flow in a microcode storage. If a macroinstruction is decoded into an entry point vector to a microcode flow in the microcode storage, the decoder initiates the microcode storage. Such initiation uses up one or more clock cycles, in which the decoder is typically idle. The microcode storage adds microinstructions of the microcode flow into an instruction queue, and when finished returns to the decoder (instructs the decoder that the microcode storage is finished writing to the instruction queue). The return from the microcode storage to the decoder also uses up one or more clock cycles, in which the decoder is typically idle.

In some instances microcode architectures include a loop streaming detector. However, such loop streaming detectors typically do not detect loops that include microcode flows. For such loop streaming detectors, if a microcode flow is detected, then a sequence of microinstructions is typically disqualified for use in a loop.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1A:
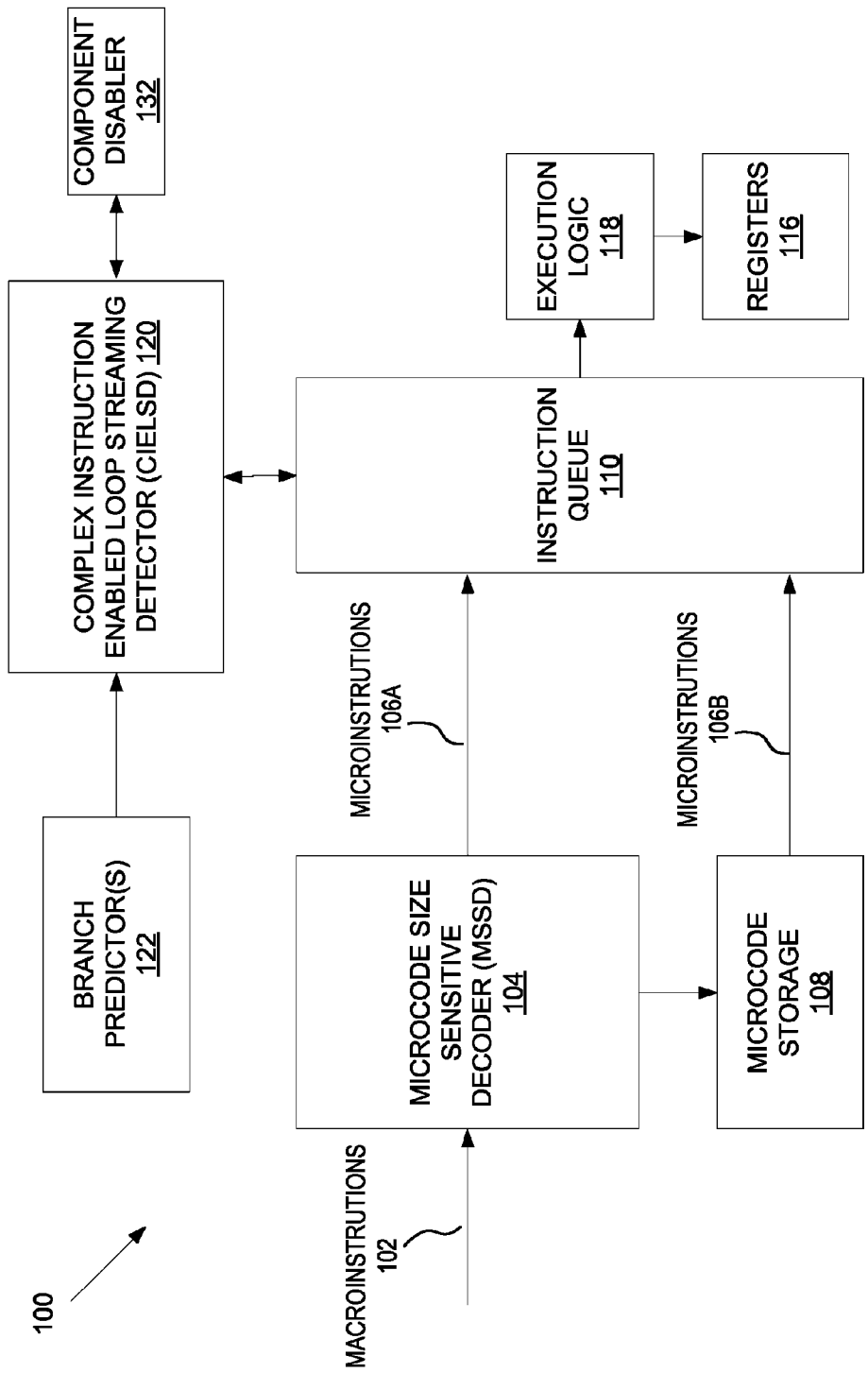
FIG. 1A is a block diagram of a processor having microarchitecture with a complex instruction enabled streaming detector, in accordance with one embodiment of the present invention.

Described herein are various embodiments of processors that use a microcode size sensitive decoder (MSSD) and/or a complex instruction enabled loop streaming detector (CIELSD). The microcode size sensitive decoder (MSSD) decodes macroinstructions into microinstructions and/or entry point vectors to microcode flows in a microcode storage. When the MSSD decodes a macroinstruction into an entry point vector to a microcode flow, the MSSD further decodes an additional indicator or tag from the macroinstruction. The additional indicator may indicate a number of clock cycles that will be used by the microcode flow, whether the microcode flow satisfies one or more looping criteria, a size of the microcode flow and/or whether the microcode flow satisfies one or more early exit criteria. If the decoded indicator indicates that the microcode flow satisfies the early exit criteria and/or indicates a number of clock cycles associated with the microcode flow, then the MSSD may perform an "early exit" from the microcode storage after initiating the microcode storage. To perform an early exit, the MSSD tracks a number of clock cycles that occur after initiating the microcode storage. Based on the decoded indicator, the MSSD can determine when the microcode storage will finish writing to an instruction queue. The MSSD may then time the decoding of a next macroinstruction so that the MSSD can write to the instruction queue at a next clock cycle after the microcode storage finishes writing to the instruction queue. Since the MSSD does not wait for a return from the microcode storage (or other indicator from the microcode storage that the microcode storage has finished writing to the instruction queue), the MSSD eliminates an exit penalty that is traditionally incurred when returning from the microcode storage to the decoder. Thus, efficiency of the processor is improved by the MSSD.

The complex instruction enabled loop streaming detector (CIELSD) is a loop streaming detector that detects loops of microinstructions and streams sequences of microinstructions (also referred to as micro-operations) from the instruction queue when a loop is detected. The CIELSD monitors one or more branch predictors to identify loops of microinstructions. A loop may be identified when the same sequence of microinstructions is identified, and when that sequence meets looping criteria. CIELSD permits complex instructions (e.g., microcode instructions from microcode flows) to be included in loops. For example, a loop may be identified if a repeated sequence of microinstructions includes microcode flows that satisfy looping criteria and if the repeated sequence is smaller than or equal to the size of the instruction queue. The indicator decoded by the MSSD may be used to determine whether microcode flows qualify for looping. Once the CIELSD identifies a loop of microinstructions, the CIELSD may begin sequencing microinstructions from the loop, and may cause one or more components of an instruction pipeline that are upstream of the instruction queue to be disabled. The CIELSD may therefore reduce a power consumption of the processor and further improve an efficiency of the processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the described embodiments. It will be apparent, however, to one skilled in the art that these specific details need not be employed to practice the described embodiments. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring embodiments of the present invention.

Although the following embodiments are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a computer-readable, tangible medium, which when performed by a machine (e.g., a computing device) cause the machine to perform functions consistent with at least one embodiment of the invention. In one embodiment, functions associated with embodiments of the present invention are embodied in computer-readable instructions. The instructions can be used to cause a general-purpose or special-purpose processor that is programmed with the instructions to perform described operations. Embodiments of the present invention may be provided as a computer program product or software which may include a machine or computer-readable medium having stored thereon instructions which may be used to program a computer (or other electronic devices) to perform one or more operations described herein. Alternatively, operations of embodiments of the present invention might be performed by specific hardware components that contain fixed-function logic for performing the operations, or by any combination of programmed computer components and fixed-function hardware components.

FIG. 1A is a block diagram of an embodiment of a processor 100 having a microcode size sensitive decoder (MSSD) and a complex instruction enabled loop streaming detector (CIELSD) 120. In alternative embodiments, the processor 100 may include a conventional decoder or a conventional loop streaming detector. The processor 100 may be any of various complex instruction set computing (CISC) processors, various reduced instruction set computing (RISC) processors, various very long instruction word (VLIW) processors, various hybrids thereof, or other types of processors.

In one or more embodiments, the processor 100 may be a general-purpose processor, such as, for example, one of the general-purpose processors manufactured by Intel Corporation, of Santa Clara, Calif. A few representative examples of suitable general-purpose processors available from Intel Corporation include, but are not limited to, Intel® Atom™ Processors, Intel® Core™ processors, Intel® Core™ 2 processors, Intel® Pentium® processors, and Intel® Celeron® processors.

Alternatively, the processor may be a special-purpose processor. Representative examples of suitable special-purpose processors include, but are not limited to, network processors, communications processors, cryptographic processors, graphics processors, co-processors, embedded processors, and digital signal processors (DSPs), to name just a few examples. These processors can also be based on CISC, RISC, VLIW, hybrids thereof, or other types of processors. In still other embodiments, the processor or instruction processing apparatus may represent a controller (e.g., a microcontroller), or other type of logic circuit capable of processing microcode or microinstructions.

The processor 100 includes a microcode size sensitive decoder (MSSD) 104. The MSSD 104 may receive and decode higher-level machine instructions or macroinstructions 102 (e.g., from a pre-fetch buffer). The MSSD 104 may generate and output one or more lower-level microinstructions 106A based on or derived from the macroinstructions. The microinstructions output from the MSSD 104 may represent microinstructions (also called micro-operations, micro ops, or uops) or microcode entry points (entry point vectors to microcode flows in a microcode storage 108). The microinstructions may implement the operations of the higher-level or machine-level instructions through lower-level (e.g., circuit-level or hardware-level) operations. The processor or apparatus may have particular circuitry responsive to the microinstructions.

The MSSD 104 may be implemented using various different types of mechanisms. Examples of suitable types of mechanisms include, but are not limited to, microcode read only memories (ROMs), look-up tables, hardware implementations, programmable logic arrays (PLAs), and the like. In some cases, the MSSD 104 may represent, or be replaced or supplemented by, an instruction emulator, an instruction translator, an instruction morpher, an instruction interpreter, or other instruction conversion logic. Various different types of instruction emulators, instruction morphers, instruction translators, and the like, are known in the arts. The MSSD 104 or other instruction conversion logic may be implemented in hardware (e.g., circuitry), firmware, software, or a combination thereof.

The MSSD 104 includes logic to generate and output indicators for generated entry point vectors to microcode. The indicators may be implemented as, for example, a tag of one or a few bits included in the entry point vectors. An indicator may alternatively be separate data or metadata associated with an entry point vector. The indicators may identify a number of clock cycles that will be used by the microcode flow, whether the microcode flow satisfies one or more looping criteria, a size of the microcode flow and/or whether the microcode flow satisfies one or more early exit criteria.

After generating an entry point vector to the microcode in the microcode storage 108, MSSD 104 initiates the microcode storage 108 and/or passes the entry point vector to the microcode storage 108. The microcode storage 108 stores microcode flows, or groups or sequences of microinstructions. The MSSD 104 may provide certain instructions (which may be included in or associated with the entry point vectors) to the microcode storage 108. The microcode storage 108 may further decode these instructions into microinstructions 106B, and may input the microinstructions 106B into the instruction queue 110.

Figure 1B:
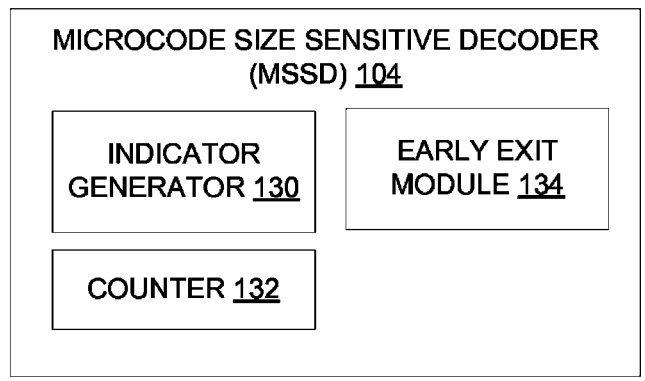
FIG. 1B is a block diagram of an embodiment of a microcode size sensitive decoder.

Referring to FIG. 1B, MSSD 104 may include an indicator generator 130, a counter 132 and an early exit module 134 in one embodiment. Indicator generator 130 generates one or more indicators (e.g., tags) from a received macroinstruction. The indicator generator 130 may, for example, add one or more bits to a beginning or end of a generated entry point vector to microcode in a microcode storage. In one example, the indicator generator 130 generates an indicator having one of four states for entry point vectors. Such an indicator may be two bits long. A first bit state of 00 may indicate that a microcode flow does not qualify for early exit and/or that the microcode flow is not to be used in loops of microinstructions. A second bit state of 01 may indicate that an associated microcode flow is one clock cycle long and/or that the microcode flow may be used in loops of microinstructions. A third bit state of 10 may indicate that an associated microcode flow is two clock cycles long and/or that the microcode flow may be used in loops of microinstructions. A fourth bit state of 11 may indicate that an associated microcode flow is three clock cycles long and/or that the microcode flow may be used in loops of microinstructions.

In alternative embodiments, a greater variety of indicators may be generated. Such indicators may use more than 2 bits. For example, additional indicators may indicate that a microcode flow is 4 clock cycles long or 5 clock cycles long. In another example, an indicator may indicate that a microcode flow qualifies for early exit but not looping, or that the microcode flow qualifies for looping but not early exit. In other embodiments, fewer types of indicators may be generated, which may be represented by a single bit. For example, an indicator with a 0 value may show that a microcode flow does not qualify for looping, while an indicator with a 1 value may show that a microcode flow does qualify for looping.

A generated indicator may identify a length of an associated microcode flow (e.g., a number of clock cycles that it will take for the microcode flow to write all of its microinstructions to an instruction queue). In such an instance, MSSD 104 may start a counter 132 when it initiates the microcode storage and passes an entry point vector associated with the generated indicator to the microcode storage. The counter 132 may count clock cycles.

Early exit module 134 may determine the number of clock cycles that the microcode storage will use to insert microinstructions into the instruction queue. Early exit module may also determine a number of cycles that it takes to decode a macroinstruction (e.g., one cycle). Accordingly, early exit module 134 may cause MSSD 104 to begin decoding a next macroinstruction prior to the microcode storage returning to MSSD 104 based on a count provided by counter 132 and the generated indicator. For example, if a microcode flow will use 3 clock cycles (identified by a bit state of 11) and it takes 1 clock cycle to decode a macroinstruction, early exit module 134 may decode a next macroinstruction 3 clock cycles after the microcode storage is initiated (e.g., after control is passed to the microcode storage). At a $4^{th}$ clock cycle after the microcode storage was initiated, MSSD 104 may then write a generated microinstruction to the instruction queue. In such an instance, the exit penalty of one or more clock cycles that is incurred when the microcode storage returns to (e.g., passes control back to) the MSSD may be eliminated.

Referring again to FIG. 1A, in one embodiment processor 100 includes multiple MSSDs. The two or more MSSDs may decode macroinstructions in parallel, and each MSSD may write to the instruction queue 110 in a single clock cycle. Accordingly, if two MSSDs are included, then two microinstructions may be written by MSSDs to the instruction queue per clock cycle. In one embodiment, a first MSSD is coupled to (and capable of invoking) microcode storage 108, while a second MSSD is not capable of invoking microcode storage 108. In such an embodiment, if the first MSSD decodes a macroinstruction into an entry point vector to microcode, the first MSSD passes the decoded entry point vector to the second MSSD. The second MSSD may then pass the entry point vector to the microcode storage 108. Alternatively, some or all of the MSSDs are coupled to (and capable of passing entry point vectors to) the microcode storage 108.

The microcode storage 108 in one embodiment has a number of ports to the instruction queue that is equal to the number of MSSDs. Accordingly, the microcode storage 108 may write the same number of microinstructions to the instruction queue as the MSSDs. For example, if there are two MSSDs, then the microcode storage 108 may have two data connections to the instruction queue through which microcode storage 108 may write microinstructions to the instruction queue 110.

Processor 100 includes instruction queue 110, which receives microinstructions from microcode storage 108 and from MSSD 104. Instruction queue 110 may be logically disposed or coupled between the MSSD 104 and execution logic 118. Instruction queue 110 may be a memory or register that holds up to a fixed number of microinstructions. In one example shown in FIG. 2, an instruction queue is 20 microinstructions wide. However, an instruction queue 110 may be designed with any width (e.g., capable of storing any number of microinstructions). Microinstructions may be written to a tail of the instruction queue and read from a head of the instruction queue 110. In a standard operating mode, the head and tail of the instruction queue may be dynamic, and a current head and tail may be recorded by instruction queue 110. Each time a microinstruction is written to the instruction queue, the tail may increment to a next address, and each time a microinstruction is read from the instruction queue the head may increment to a next address. For example, after a microinstruction is written to address 1 of the instruction queue 110, the tail may move to address 2 of the instruction queue, and so on.

The processor 100 also includes a plurality of registers 116 and execution logic 118. The execution logic 118 may include one or more execution cores each having one or more execution units. In one aspect, the execution units may include at least some hardware (e.g., circuitry). The microinstructions from the instruction queue 110 may be executed by the execution logic 118, with source data potentially being accessed from, and results potentially being stored in, the registers 116.

Processor 100 includes one or more branch predictors 122. For example, processor 100 may include a macroinstruction branch predictor and a microinstruction branch predictor. The macroinstruction branch predictor may predict macroinstruction branches, which may be macroinstructions within an instruction set. The macroinstruction branch predictor predicts branches before the macroinstructions have been decoded. Examples of branches include direct branches, indirect branches, calls, returns, conditional branches, and so on. The macroinstruction branch predictor may include a branch target buffer (BTB) that stores a direction and a target. The BTB may be used for both conditional branches and direct branches, and may be used to predict the last value of an indirect branch. The macroinstruction branch predictor may also include a return stack buffer (RSB) that stores calls and/or return addresses.

A microinstruction branch predictor may predict branches (e.g., future microinstructions) after the macroinstructions have been decoded. The microinstruction branch predictor may include an RSB that stores calls and/or return addresses. However, the RSB of the microinstruction branch predictor may be larger and more accurate than the RSB of the macroinstruction branch predictor. The microinstruction branch predictor may also include an indirect predictor and/or a conditional predictor that is used to perform prediction when conditional statements are encountered.

The one or more branch predictors 122 can accurately predict future branches (e.g., future microinstructions that are likely to be called). In one embodiment, processor 100 includes a complex instruction enabled loop streaming detector (CIELSD) 120 that monitors the predictions of the one or more branch predictors 122 to detect loops of microinstructions. The CIELSD 120 may be implemented in hardware (e.g., circuitry), software, firmware, or a combination thereof. In one aspect, the CIELSD 120 includes at least some circuitry. The circuitry may be particular circuitry that is responsive to microinstructions.

A loop of microinstructions (also referred to as a microinstruction loop) is a sequence of microinstructions that repeats. For example, the same sequence of 6 microinstructions may repeat 1000 times. For such a loop, it is inefficient to decode the same macroinstructions into the same set of microinstructions repeatedly 1000 times. Accordingly, CIELSD 120 may detect a microcode loop. Once a detected microcode loop is written to the instruction queue 110, CIELSD 120 may enter a looping mode, which causes the instruction queue to stop receiving microinstructions from the microcode storage 108 and/or decoder 104. While the looping mode is enabled, CIELSD 120 may change a behavior of instruction queue 110 so that microinstructions are neither added to nor removed from the instruction queue 110. Instead, CIELSD 120 may cause the same sequence of microinstructions that form the detected loop to be sequenced from the instruction queue 110 repeatedly until a loop exit criterion is satisfied. The loop exit criterion may be triggered by a downstream component (e.g., execution logic 118) in one embodiment. For example, the loop exit may be triggered by a misprediction, by an exception, or by an interrupt.

In one embodiment, CIELSD 120 instructs component disabler 132 to disable (e.g., power down) one or more components of the processor 100 while the looping mode is active. The instruction queue 110, microcode storage 108, branch predictors 122, MSSD 104 and execution logic 118 may form an instruction pipeline along with additional components such as a translation lookaside buffer (TLB), an instruction cache, a pre-fetch buffer, and so on. The MSSD 104, microcode storage 108, branch predictors 122 and/or other components of the instruction pipeline that are upstream of the instruction queue 110 may be disabled while the looping mode is active. This may save considerable power. Additionally, sequencing microinstructions from the instruction queue in a loop may use fewer clock cycles than sequencing microinstructions in the traditional manner. Once the loop is terminated, component disabler 132 may power up the one or more disabled components.

Figure 1C:
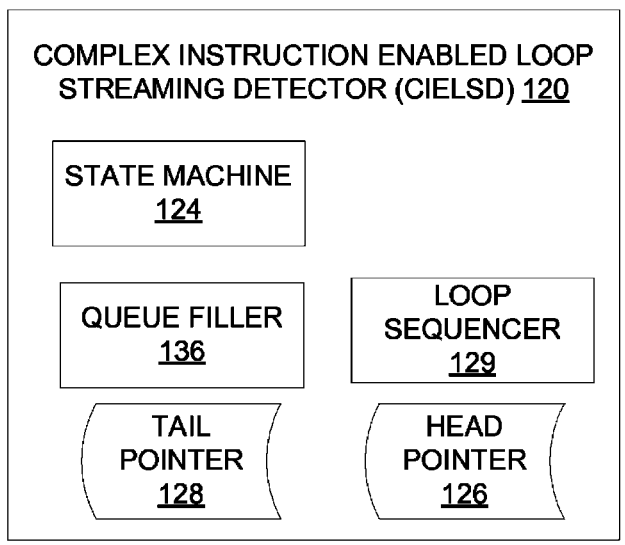
FIG. 1C is a block diagram of an embodiment of a complex instruction enabled loop streaming detector.

FIG. 1C illustrates one embodiment of CIELSD 120, which includes a state machine 124, a loop filler 136, a head pointer 126, a tail pointer 128 and a loop sequencer 129. State machine 124 records references or identifiers for sequences of microinstructions. In one embodiment, state machine 124 holds at least a number of entries that is equal to a size of the instruction queue. This enables the state machine 124 to hold information for a loop that can fit into the instruction queue. CIELSD 120 may add identifiers for microinstructions and/or microcode flows to the state machine 124 as branches are predicted. When a microcode is added to the state machine 124 that does not satisfy a looping criterion (or a microinstruction associated with such a microcode flow), state machine 124 may be reset (e.g., emptied).

Once state machine 124 holds identifiers for a recognized loop, CIELSD 120 may wait for the microinstructions associated with that loop to be added to the instruction queue. When the microinstructions associated with the recognized loop are added to the instruction queue, CIELSD 120 may initiate a looping mode for the instruction queue. This may cause the decoder to stop decoding macroinstructions and/or cause the instruction queue to stop accepting insertions of new microinstructions.

After a loop of microinstructions is identified in the instruction queue, queue filler 136 may roll the loop out into the instruction queue to fill the instruction queue (e.g., populates the instruction queue with as many iterations of the loop as will fit in the queue). Reading from non-sequential addresses in the instruction queue may consume an additional clock cycle than reading from sequential addresses. Accordingly, by filling the instruction queue with multiple iterations of a loop, the number of additional clock cycles that are used to jump from the tail of the loop to the head of the loop can be minimized, thus improving efficiency.

CIELSD 120 records a head pointer 126 to a first microinstruction in a first iteration of the loop and a tail pointer 128 to a last microinstruction in a last iteration of the loop. Loop sequencer 129 sequences microinstructions from the loop. Loop sequencer 129 starts by sequencing the microinstruction at the address referenced by the head pointer 126. Loop sequencer 129 then sequences subsequent microinstructions sequentially until a microinstruction referenced by the tail pointer 128 is sequenced. Once the microinstruction at the address referenced by the tail pointer 128 is sequenced, loop sequencer 129 jumps back to the microinstruction at the address referenced by the head pointer 126 and starts over. This process continues until a loop exit criterion is satisfied.

Figure 2:
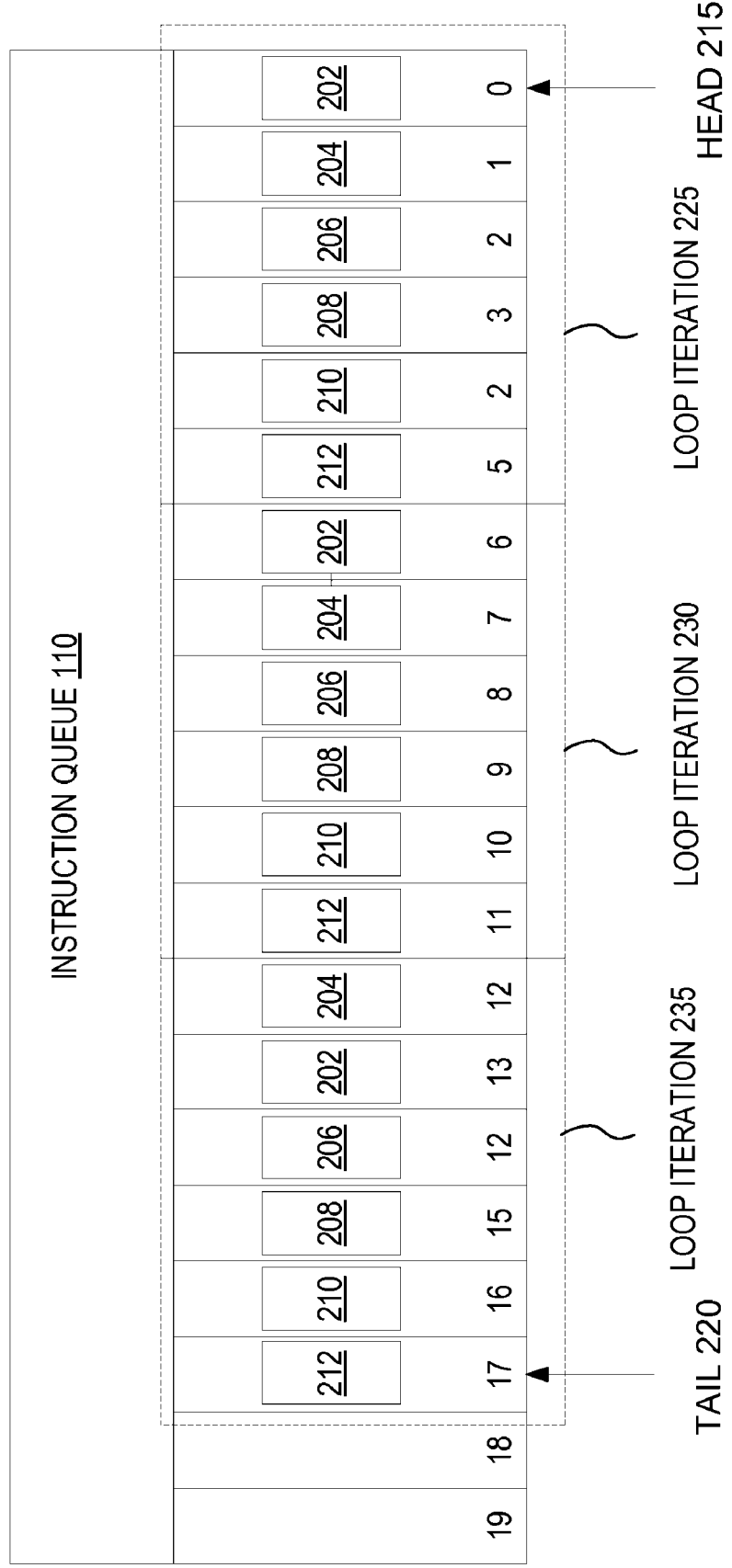
FIG. 2 is a block diagram of an embodiment of an instruction queue populated with multiple iterations of an identified loop of microinstructions.

FIG. 2 illustrates one example of an instruction queue 110. The example instruction queue 110 holds twenty microinstructions at addresses 0 through 19. However, instruction queues of other sizes may also be used. As shown, an example loop has been inserted into the instruction queue 110, the loop having a first microinstruction 202, second microinstruction 204, third microinstruction 206, fourth microinstruction 208, fifth microinstruction 210 and sixth microinstruction 212. Since the loop is six microinstructions long, three iterations of the loop 225, 230, 235 will fit into the instruction queue 110. Accordingly, the instruction queue 110 is populated with three loop iterations 225, 230, 235. A CIESD records a pointer to a head 215 of the rolled out loop and a pointer to a tail 220 of the rolled out loop.

To avoid obscuring the description, a relatively simplistic processor 100 has been shown and described with reference to FIGS. 1A-2. It will be appreciated that the processor may optionally include one or more other well-known components, such as, for example, one or more of instruction fetch logic, branch prediction logic, instruction and data caches, instruction and data translation lookaside buffers, prefetch buffers, microinstruction sequencers, bus interface units, second or higher level caches, instruction scheduling logic, retirement logic, register renaming logic, and the like, and various combinations thereof.

Figure 3:
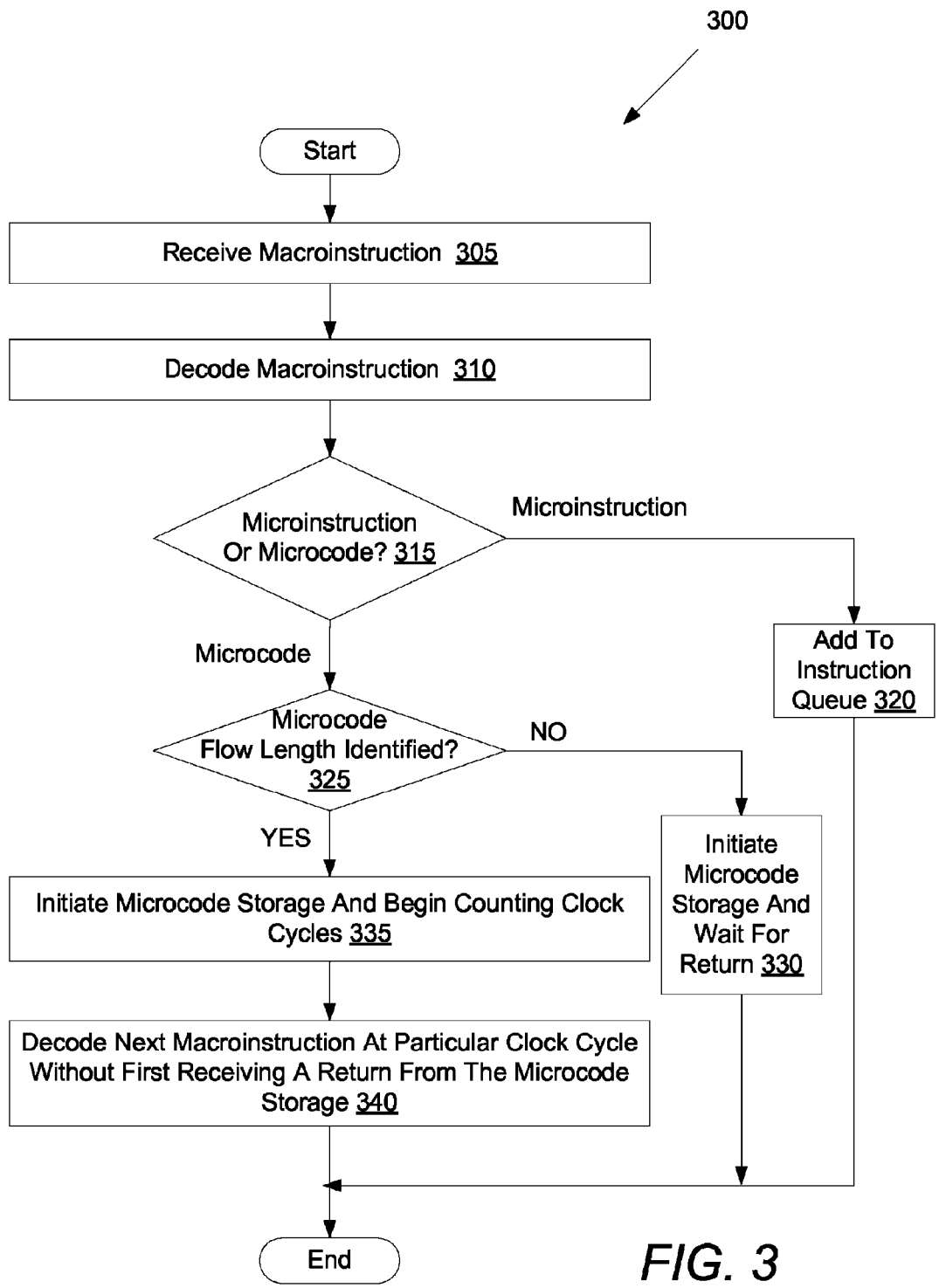
FIG. 3 is a flow diagram of an embodiment for a method of adding microinstructions to an instruction queue.

FIG. 3 is a flow diagram of an embodiment of a method 300 of identifying and using a loop of microinstructions. In one or more embodiments, the method may be performed by and/or within a processor or other instruction processing apparatus. For example, in one or more embodiments, the method may be performed by processing logic of processor 100 of FIG. 1 (e.g., by MSSD 104 of processor 100). Alternatively, the method 300 may be performed by and/or within a processor or other instruction processing logic.

At block 305 of method 300 processing logic receives a macroinstruction. The macroinstruction may be retrieved from a pre-fetch buffer in one embodiment. At block 310, processing logic decodes the macroinstruction. Decoding the macroinstruction may include generating a particular microinstruction based on the macroinstruction or generating an entry point vector to a microcode flow in a microcode storage based on the macroinstruction. If a macroinstruction is decoded into an entry point vector to microcode, that generated entry point vector may include an indicator that identifies one or more properties of the microcode. The indicator may be implemented as a component of the entry point vector or as metadata associated with the entry point vector. The indicator may identify, for example, a length of the microcode flow, whether the microcode flow qualifies for looping and/or whether the microcode flow qualifies for an early exit.

At block 315, processing logic determines whether the macroinstruction decoded into a microinstruction or into an entry point vector to microcode. If the macroinstruction decoded into a microinstruction, the method proceeds to block 320, at which processing logic adds the decoded microinstruction to an instruction queue. If the macroinstruction decoded into an entry point vector to the microcode storage, the method continues to block 325.

At block 325, processing logic determines whether an indicator was decoded with the entry point vector to the microcode flow that identifies a length of the microcode flow. If not, then the microcode flow does not qualify for early exit, and the method proceeds to block 330. If an indicator identifying a length of the microcode flow was decoded, then the method continues to block 335.

At block 330, processing logic initiates the microcode storage and passes the entry point vector to the microcode storage. Processing logic then waits for a return from the microcode storage before decoding any additional macroinstructions.

At block 335, processing logic initiates the microcode storage, passes the entry point vector to the microcode storage, and additionally begins counting clock cycles. Processing logic caches or stores the indicator associated with the entry point vector (or the microcode flow length included in the indicator). At block 340, processing logic determines when to begin decoding a next macroinstruction based on the known length of the microcode flow and a clock cycle count. Processing logic decodes the next macroinstruction at a particular clock cycle without first receiving a return from the microcode storage. Processing logic may time the decoding of the next macroinstruction such that processing logic is ready to write a decoded microinstruction to the instruction queue as soon as the microcode storage completes writing a last microinstruction of the microcode flow to the instruction queue, thus eliminating any "exit penalty" associated with returning from the microcode storage to a decoder.

Figure 4:
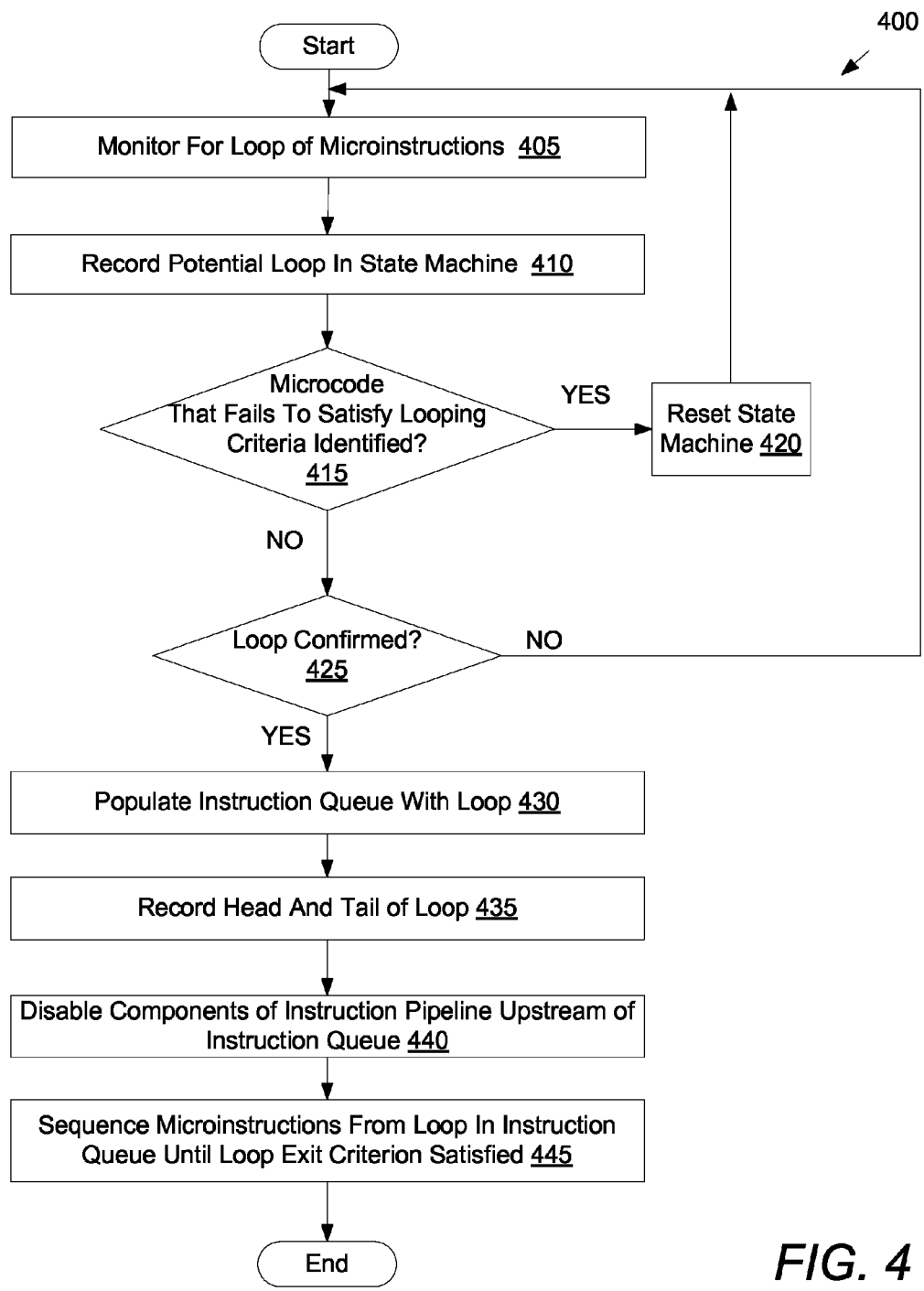
FIG. 4 is a flow diagram of an embodiment for a method of identifying and using a loop of microinstructions.

FIG. 4 is a flow diagram of an embodiment for a method of identifying and using a loop of microinstructions. In one or more embodiments, the method may be performed by and/or within a processor or other instruction processing apparatus. For example, in one or more embodiments, the method may be performed by processing logic of processor 100 of FIG. 1 (e.g., by CIELSD 120 of processor 100). Alternatively, the method 400 may be performed by and/or within a processor or other instruction processing logic.

At block 405 of method 400, processing logic monitors for a loop of microinstructions. This may be performed by monitoring a branch predictor and recognizing that the same address or addresses have repeated in the predictor, and then verifying that the repeated address or addresses represent a loop. For example, processing logic may capture an address of a branch target and count a number of subsequent microinstructions until the address is encountered again. Processing logic may then check whether the same address and same number of microinstructions has occurred repeatedly (e.g., two or more times).

At block 410, processing logic records a potential loop in a state machine 410. At block 415, processing logic determines whether the potential loop satisfies one or more looping criteria. The looping criteria may include a criterion that no microcode flows longer than a length threshold are included in the potential loop, a criterion that all microcode flows in the potential loop will use a fixed number of clock cycles to execute, and so on. In one embodiment, each microcode flow included in the potential loop has an associated identifier. The associated identifiers may indicate whether a particular microcode flow satisfies the looping criteria. If any microcode flows are added to the state machine that are associated with indicators showing that those microcode flows do not satisfy the looping criteria, then processing logic may determine that the potential loop does not satisfy the looping criteria. If the potential loop fails to satisfy the looping criteria, the method continues to block 420 and the state machine is reset. The method then returns to block 405 to continue monitoring for loops of microinstructions.

If at block 415 the potential loop does satisfy the looping criteria, the method continues to block 425. At block 425, processing logic determines whether the potential loop is confirmed as an actual loop. If no actual loop is confirmed, the method returns to block 405. If an actual loop is confirmed, the method continues to block 430.

At block 430, processing logic populates an instruction queue with the microinstructions of the loop. This may include writing multiple iterations of the loop into the instruction queue until the instruction queue is full or approximately full. In one embodiment, processing logic writes a maximum number of complete iterations of the loop to the instruction queue that will fit in the instruction queue. At block 435, processing logic records an address for a head of the loop and a tail of the loop.

In one embodiment, at block 440 processing logic disables one or more components of an instruction pipeline that are upstream of the instruction queue. Alternatively, the upstream components may not be disabled.

At block 445, processing logic sequences microinstructions from the loop in the instruction queue until a loop exit criterion is satisfied. Once an external exit criterion is satisfied, the instruction queue is flushed, the upstream components are re-enabled (if they were disabled), and loop detection begins again.

Figure 5:
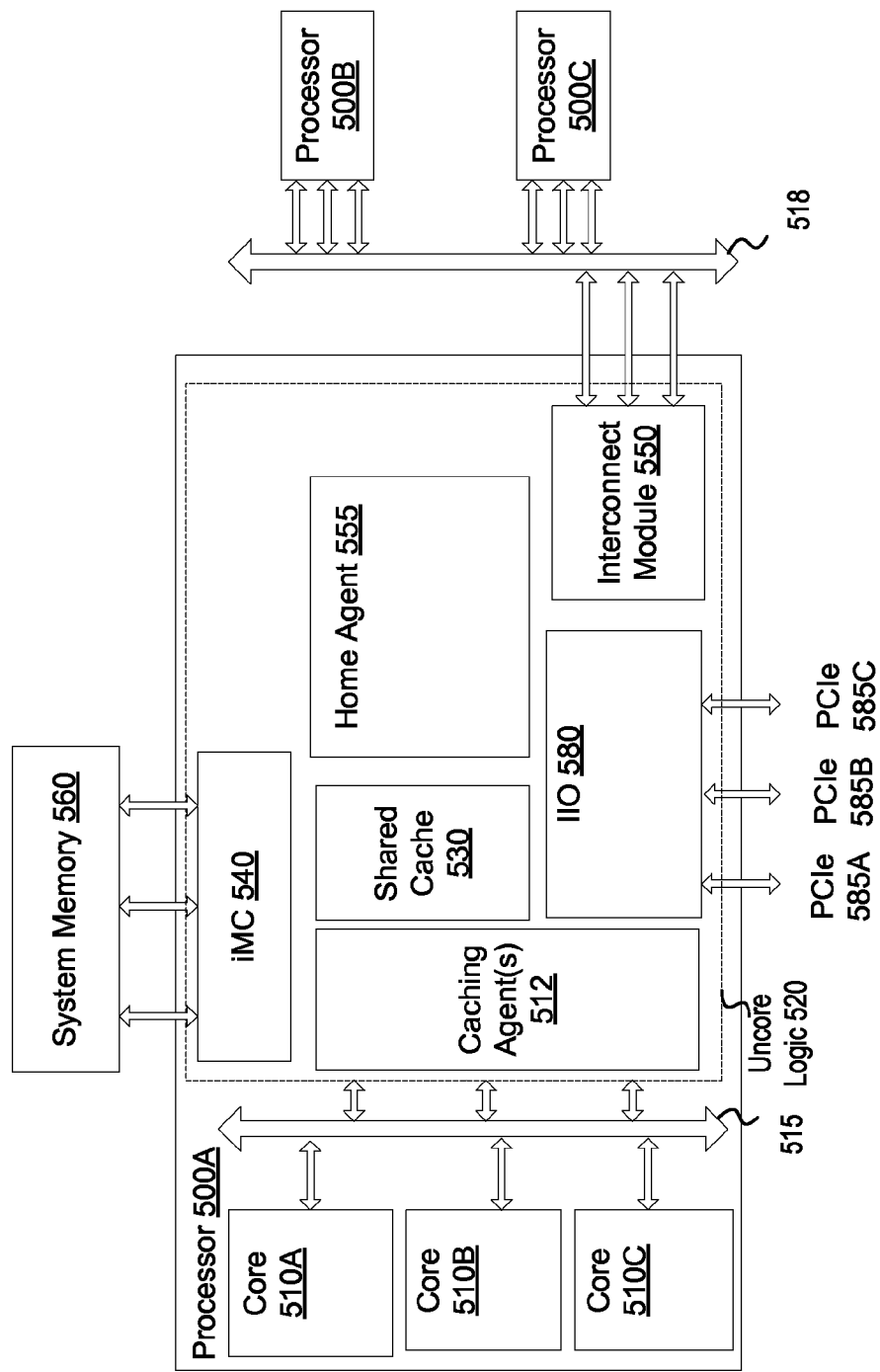
FIG. 5 is a block diagram of a multi-core processor coupled to additional processors, in accordance with an embodiment of the present invention.

Referring now to FIG. 5, shown is a high level block diagram of a processor 500A in accordance with an embodiment of the present invention. In one embodiment, processor 500A corresponds to processor 100 of FIG. 1. For example, processor 500A may be a multicore processor including multiple cores 510A-510C that includes the MSSD 104 and/or CIELSD 120 as described with reference to FIG. 1. These cores may be physical processors, and may include various components such as front end units, execution units and back end units.

The various cores may be coupled via an interconnect 515 to an uncore logic 520. The uncore logic 520 is logic of the processor 510A outside of the cores that includes various components. Uncore logic 520 may include a shared cache 530 which may be a last level cache (LLC). In addition, the uncore logic 520 may include an integrated memory controller (iMC) 540, a home agent (HA) 555, one or more caching agents (referred to as Cbos) 512, an integrated input/output cluster (IIO) 580, and an interconnect module 550 that connects the processor 500A to other processors 500B, 500C via an interconnection 518.

One or more caching agents 512 (Cbos) manage the interface 515 between the cores 510A-C and the shared cache 530. Thus, caching agents 512 write data to and read data from cache lines in shared cache 530. The caching agents 512 are responsible for managing data delivery between the cores 510A-C and the shared cache 512. The caching agents 512 are also responsible for maintaining cache coherency between the cores 510A-C within a single socket (e.g., within processor 500A). This may include generating snoops and collecting snoop responses from cores 510A-C in accordance with a cache coherence protocol such as MESI, MOSI, MOESI, or MESIF. The uncore logic 520 may include multiple caching agents 512 (e.g., 8 caching agents in one embodiment), each assigned to manage a distinct subset of the shared cache.

The caching agents 512 may act as a proxy between the IIO 580 and the interconnect module 550, which in one embodiment is a QuickPath Interconnect (QPI). Thus, the caching agents 512 perform a gate keeper function for all messages that originate from the IIO 580 and that are to be transmitted to remote sockets (e.g., processors 500B-C). Similarly, the caching agents 512 may act as a proxy for messages originating in the remote sockets and associated with a cache line that is owned by an I/O device that IIO 580 communicates with.

Integrated input/output cluster (IIO) 580 is an I/O controller that is included in processor 500A. In alternative embodiments an external input/output controller (e.g., an I/O controller hub, which may be a component of a southbridge integrated circuit) may be used rather than IIO 580. IIO 580 (or other I/O controller) connects to and controls I/O devices. For example, IIO 580 may connect to I/O devices via PCI, PCI express (PCIe), PCI extended (PCI-X), or other buses 585A-C. The I/O devices may be, for example, network adapters, graphics cards, audio cards, SCSI controllers, cluster interconnects, hard drive controllers, disk drives, and so forth.

Home agent 555 controls coherent access to, and otherwise manages, a subset of a system memory 560. Home agents are responsible for ensuring that a most recent version of data is returned to a requestor either from memory or a cache. The home agents are also responsible for invalidating cache lines associated with caching agents responsive to requests for exclusive access to the data. For example, home agent 555 may perform various processing for requests directed to a portion of system memory 560 coupled to processors 500A-C. This region of system memory (e.g., a range of memory addresses and/or cache lines) may, for example, correspond to one or more dual in-line memory modules (DIMMs). More specifically, home agent 555 may receive incoming requests that are directed to this region of memory and, via logic present in the home agent 555, resolve conflicts and maintain ordering of transactions among other operations. Accordingly, home agent 555 may include logic to receive requests from various components or agents (e.g., caching agents 512 from any of processors 500A-C) and route these requests as appropriate to the corresponding region of memory via integrated memory controller (iMC) 540 (or through an external memory controller).

Integrated memory controller 540 is the interface between system memory (e.g., DRAM) 560 and the home agent 555. Accordingly, integrated memory controller 540 translates read and write commands into specific memory commands and schedules them with respect to memory timing.

Note that each processor 500A, 500B, 500C may include its own home agent, and each home agent may be responsible for managing a different region of shared memory 1160. Each processor 500A, 500B, 500C may additionally be a multicore processor that includes an uncore logic such as uncore logic 520. Accordingly, each processor 500A-500C may be connected to different I/O devices, and may manage a different region of system memory 560. The home agents of the processors 500A-C may use a cache coherency protocol such as MESIF, MESI, etc. to maintain coherent caches of system memory 560.

Figure 6:
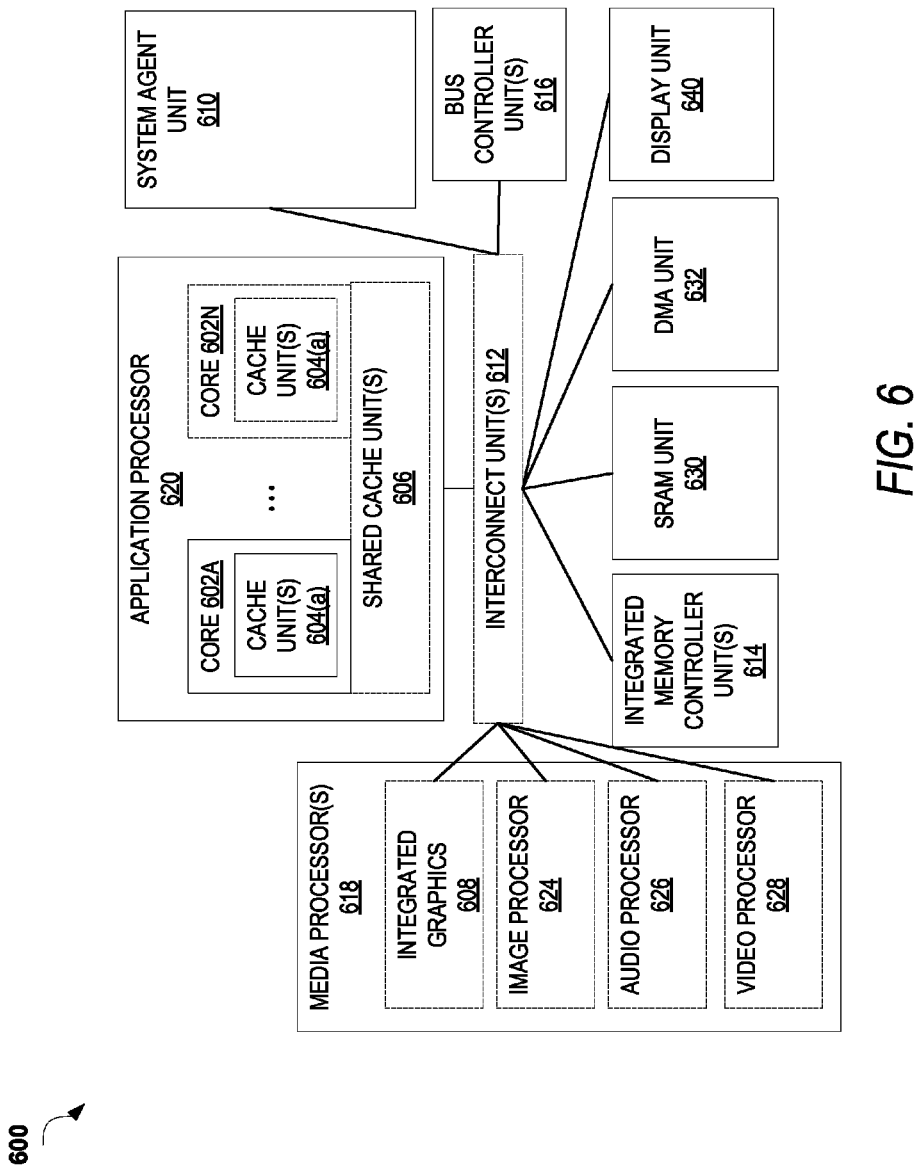
FIG. 6 is a block diagram of a system on chip (SoC) in accordance with an embodiment of the present disclosure.

Embodiments may be implemented in many different system types. FIG. 6 is a block diagram of a SoC 600 in accordance with an embodiment of the present disclosure. Dashed lined boxes are optional features on more advanced SoCs. In FIG. 6, an interconnect unit(s) 612 is coupled to: an application processor 620 that includes a set of one or more cores 602A-N and shared cache unit(s) 606; a system agent unit 610; a bus controller unit(s) 616; an integrated memory controller unit(s) 614; a set or one or more media processors 618 which may include integrated graphics logic 608, an image processor 624 for providing still and/or video camera functionality, an audio processor 626 for providing hardware audio acceleration, and a video processor 628 for providing video encode/decode acceleration; an static random access memory (SRAM) unit 630; a direct memory access (DMA) unit 632; and a display unit 640 for coupling to one or more external displays. In one embodiment, a memory module may be included in the integrated memory controller unit(s) 614. In another embodiment, the memory module may be included in one or more other components of the SoC 600 that may be used to access and/or control a memory. The application processor 620 may include an MSSD and/or CIELSD as described in embodiments herein.

The memory hierarchy includes one or more levels of cache within the cores, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof.

In some embodiments, one or more of the cores 602A-N are capable of multithreading.

The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture and/or instruction set. For example, some of the cores 602A-N may be in order while others are out-of-order. As another example, two or more of the cores 602A-N may be capable of executing the same instruction set, while others may be capable of executing only a subset of that instruction set or a different instruction set.

The application processor 620 may be a general-purpose processor, such as a Core™ i3, i5, i7, 2 Duo and Quad, Xeon™, Itanium™, XScale™ or StrongARM™ processor, which are available from Intel™ Corporation, of Santa Clara, Calif. Alternatively, the application processor 620 may be from another company, such as ARM Holdings™, Ltd, MIPS™, etc. The application processor 620 may be a special-purpose processor, such as, for example, a network or communication processor, compression engine, graphics processor, co-processor, embedded processor, or the like. The application processor 620 may be implemented on one or more chips. The application processor 620 may be a part of and/or may be implemented on one or more substrates using any of a number of process technologies, such as, for example, BiCMOS, CMOS, or NMOS.

Figure 7:
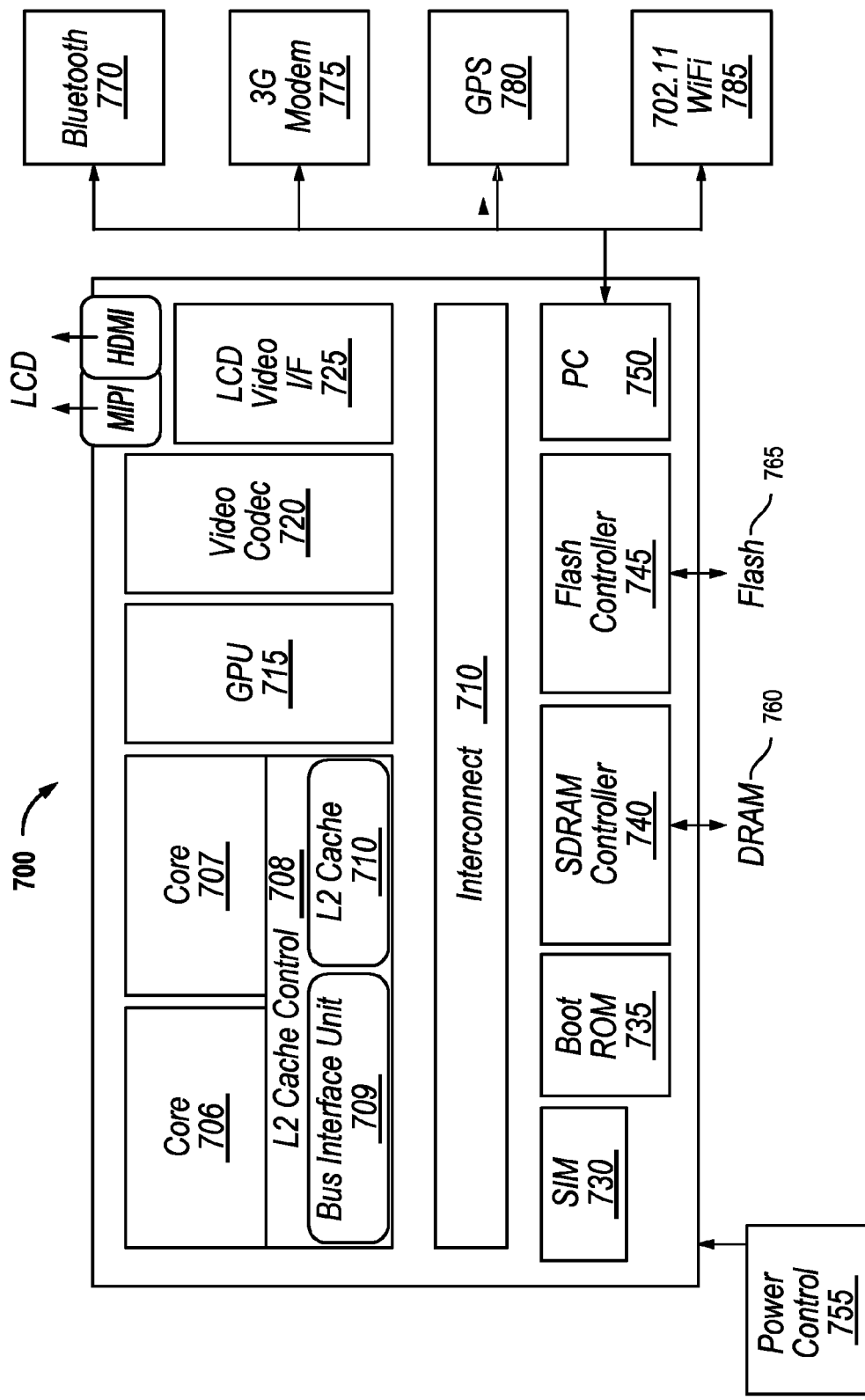
FIG. 7 is a block diagram of an embodiment of a system on-chip (SOC) design.

FIG. 7 is a block diagram of an embodiment of a system on-chip (SoC) design in accordance with the present disclosure. As a specific illustrative example, SoC 700 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 700 includes 2 cores—706 and 707. Cores 706 and 707 may conform to an Instruction Set Architecture, such as an Intel® Architecture Core™-based processor, an Advanced Micro Devices®, Inc. (AMD®) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700. Interconnect 710 includes an on-chip interconnect, such as an IOSF, AMBA, or other interconnect discussed above, which potentially implements one or more aspects of the described disclosure. In one embodiment, an MSSD and/or CIELSD may be included in cores 706, 707.

Interconnect 710 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g. DRAM 760), a flash controller 745 to interface with non-volatile memory (e.g. Flash 765), a peripheral control 750 (e.g. Serial Peripheral Interface) to interface with peripherals, video codecs 720 and Video interface 725 to display and receive input (e.g. touch enabled input), GPU 715 to perform graphics related computations, etc. Any of these interfaces may incorporate aspects of the disclosure described herein. In addition, the system 700 illustrates peripherals for communication, such as a Bluetooth module 770, 3G modem 775, GPS 780, and Wi-Fi 785.

Figure 8:
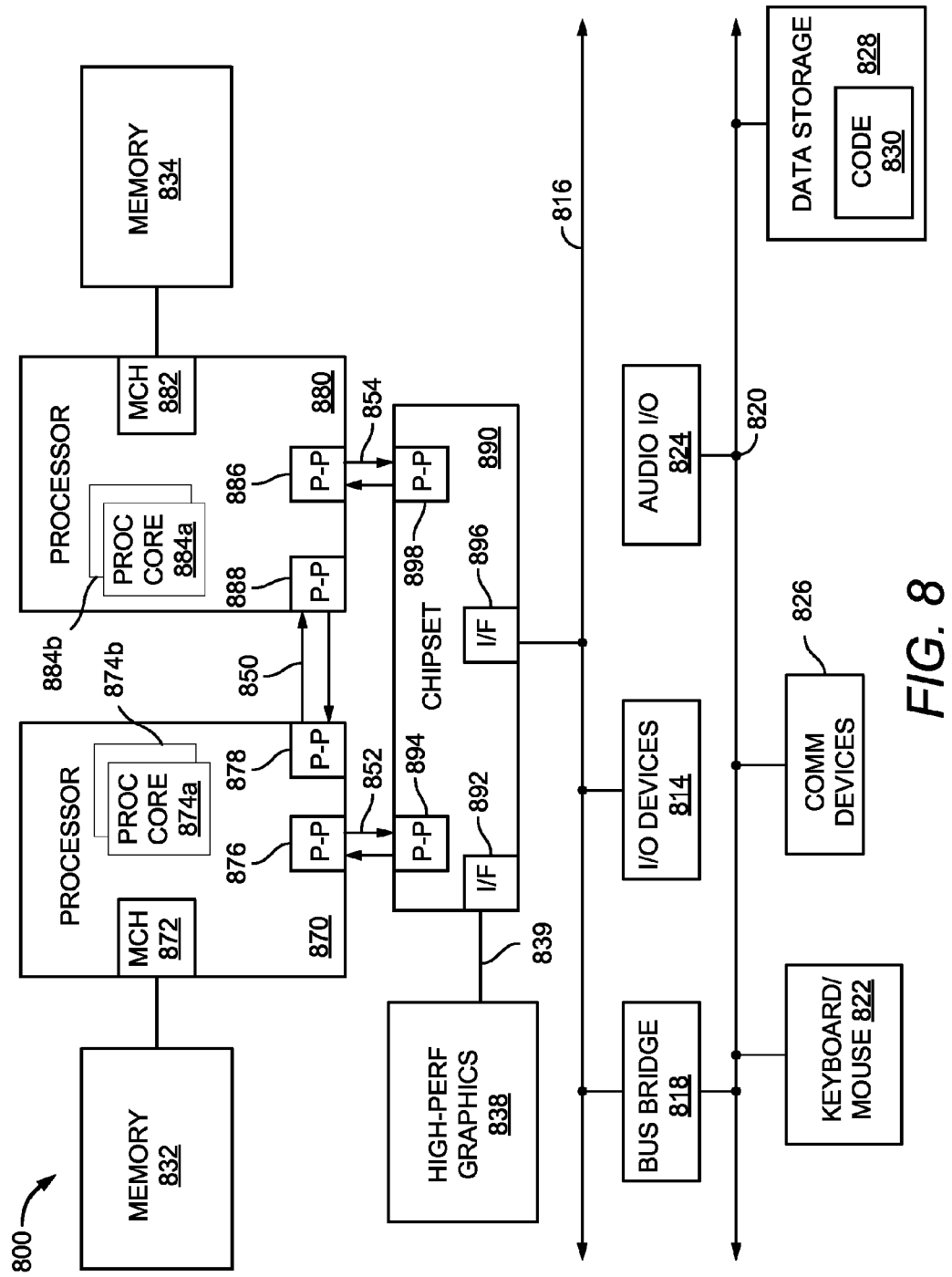
FIG. 8 is a block diagram of a computing device in accordance with an embodiment of the present invention.

Referring now to FIG. 8, shown is a block diagram of a system in accordance with an embodiment of the present invention. As shown in FIG. 8, multiprocessor system 800 is a point-to-point interconnect system, and includes a first processor 870 and a second processor 880 coupled via a point-to-point interconnect 850. One or both of the first processor 870 and the second processor 880 may include an MSSD and/or CIELSD, which may correspond to similarly named components in the preceding figures. As shown in FIG. 8, each of processors 870 and 880 may be multicore processors, including first and second processor cores (i.e., processor cores 874a and 874b and processor cores 884a and 884b), although potentially many more cores may be present in the processors.

Still referring to FIG. 8, first processor 870 further includes a memory controller hub (MCH) 872 (e.g., an integrated memory controller) and point-to-point (P-P) interfaces 876 and 878. Similarly, second processor 880 includes a MCH 882 and P-P interfaces 886 and 888. MCH's 872 and 882 couple the processors to respective memories, namely a memory 832 and a memory 834, which may be portions of main memory (e.g., a dynamic random access memory (DRAM)) locally attached to the respective processors, and which collectively may maintain a directory. First processor 870 and second processor 880 may be coupled to chipset 890 via P-P interconnects 852 and 854, respectively.

Chipset 890 includes P-P interfaces 894 and 898. Furthermore, chipset 890 includes an interface 892 to couple chipset 890 with a high performance graphics engine 838, by a P-P interconnect 839. In turn, chipset 890 may be coupled to a first bus 816 via an interface 896. Various input/output (I/O) devices 814 (also referred to as I/O devices) may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820.

Figure 9:
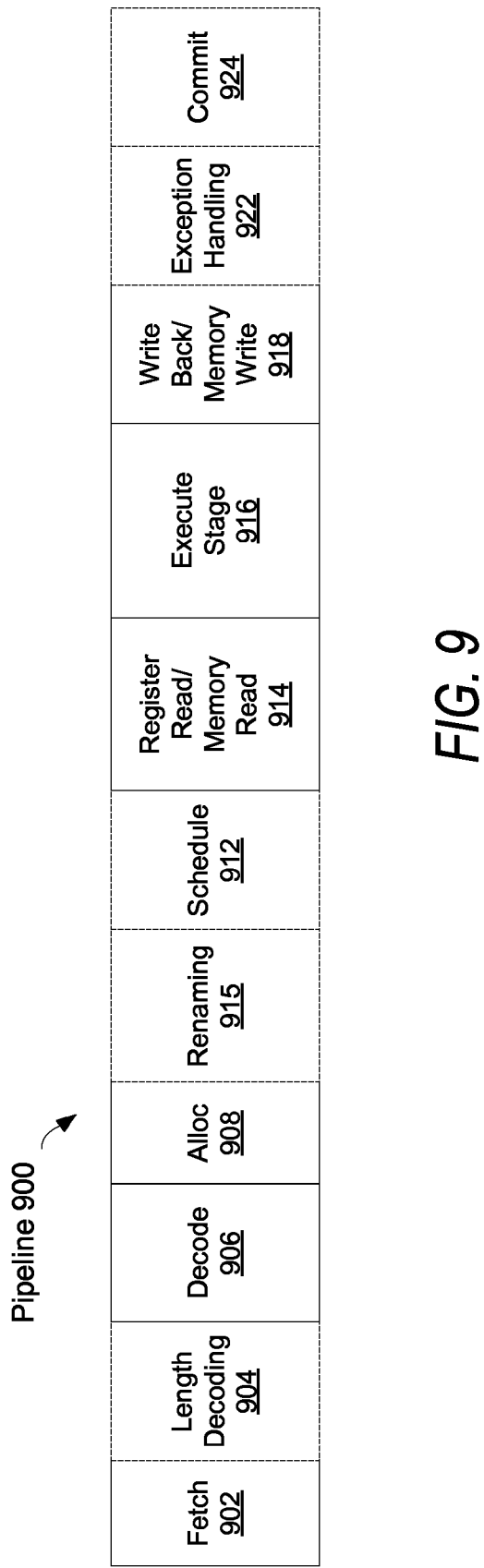
FIG. 9 is a block diagram illustrating an in-order pipeline and a register renaming stage, out-of-order issue/execution pipeline implemented by a processor core.
Figure 10:
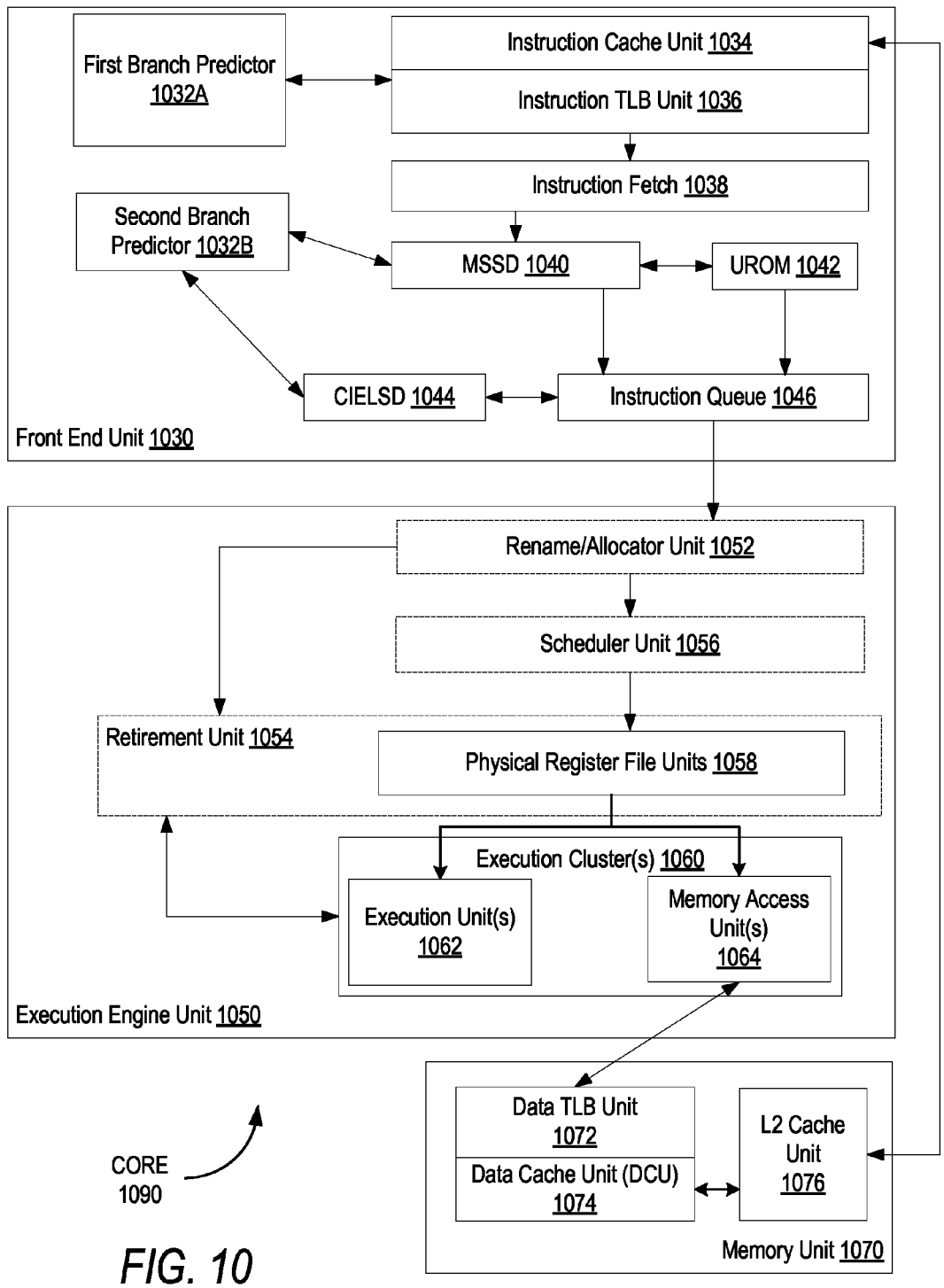
FIG. 10 is a block diagram illustrating an in-order architecture core and a register renaming logic, out-of-order issue/execution logic to be included in a processor according to at least one embodiment of the disclosure.

FIG. 9 is a block diagram illustrating an in-order pipeline and a register renaming stage, out-of-order issue/execution pipeline implemented by core 1090 of FIG. 10 (which may be included in a processor). FIG. 10 is a block diagram illustrating an in-order architecture core and a register renaming logic, out-of-order issue/execution logic that may be included in a processor according to at least one embodiment of the invention. The solid lined boxes in FIG. 9 illustrate the in-order pipeline, while the dashed lined boxes illustrates the register renaming, out-of-order issue/execution pipeline. Similarly, the solid lined boxes in FIG. 9 illustrate the in-order architecture logic, while the dashed lined boxes illustrates the register renaming logic and out-of-order issue/execution logic. In FIG. 9, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 10 is a block diagram illustrating an in-order architecture core and a register renaming logic, out-of-order issue/execution logic that may be included in a processor according to at least one embodiment of the disclosure. FIG. 10 shows processor core 1090 including a front end unit 1030 coupled to an execution engine unit 1050, and both are coupled to a memory unit 1070.

The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, graphics core, or the like.

The front end unit 1030 includes a first branch predictor 1032 coupled to an instruction cache unit 1034, which is coupled to an instruction translation lookaside buffer (TLB) 1036, which is coupled to an instruction fetch unit 1038, which is coupled to an MSSD 1040. A second branch predictor 1032B may additionally be coupled to the MSSD 1040 and/or to a CIELSD 1044. The MSSD 1040 may decode instructions, and generate as an output one or more micro-operations, micro-code entry points, microinstructions, other instructions, or other control signals, which are decoded from, or which otherwise reflect, or are derived from, the original instructions. The MSSD 1040 may be implemented using various different mechanisms. Examples of suitable mechanisms include, but are not limited to, look-up tables, hardware implementations, programmable logic arrays (PLAs), microcode read only memories (ROMs), etc. The instruction cache unit 1034 is further coupled to a level 2 (L2) cache unit 1076 in the memory unit 1070.

The MSSD 1040 is coupled to a microcode storage (e.g., a microcode read only memory (UROM)), and is further coupled to an instruction queue 1046. The UROM 1042 and the CIELSD 1044 are additionally coupled to the instruction queue 1046.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 1058 is overlapped by the retirement unit 1054 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.). Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order. In one embodiment, a memory module may be included in the memory access unit(s) 1064 of the core 1090. In another embodiment, the memory module may be included in one or more other components of the core 1090 that may be used to access and/or control a memory.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The L2 cache unit 1076 is coupled to one or more other levels of cache and eventually to a main memory.

By way of example, the exemplary register renaming, out-of-order issue/execution core architecture may implement the pipeline 900 as follows: 1) the instruction fetch 1038 performs the fetch and length decoding stages 902 and 904; 2) the decode unit 1040 performs the decode stage 906; 3) the rename/allocator unit 1052 performs the allocation stage 1008 and renaming stage 910; 4) the scheduler unit(s) 1056 performs the schedule stage 912; 5) the physical register file(s) unit(s) 1058 and the memory unit 1070 perform the register read/memory read stage 910; the execution cluster 1060 perform the execute stage 916; 6) the memory unit 1070 and the physical register file(s) unit(s) 1058 perform the write back/memory write stage 918; 7) various units may be involved in the exception handling stage 922; and 8) the retirement unit 1054 and the physical register file(s) unit(s) 1058 perform the commit stage 924.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units 1034, 1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11:
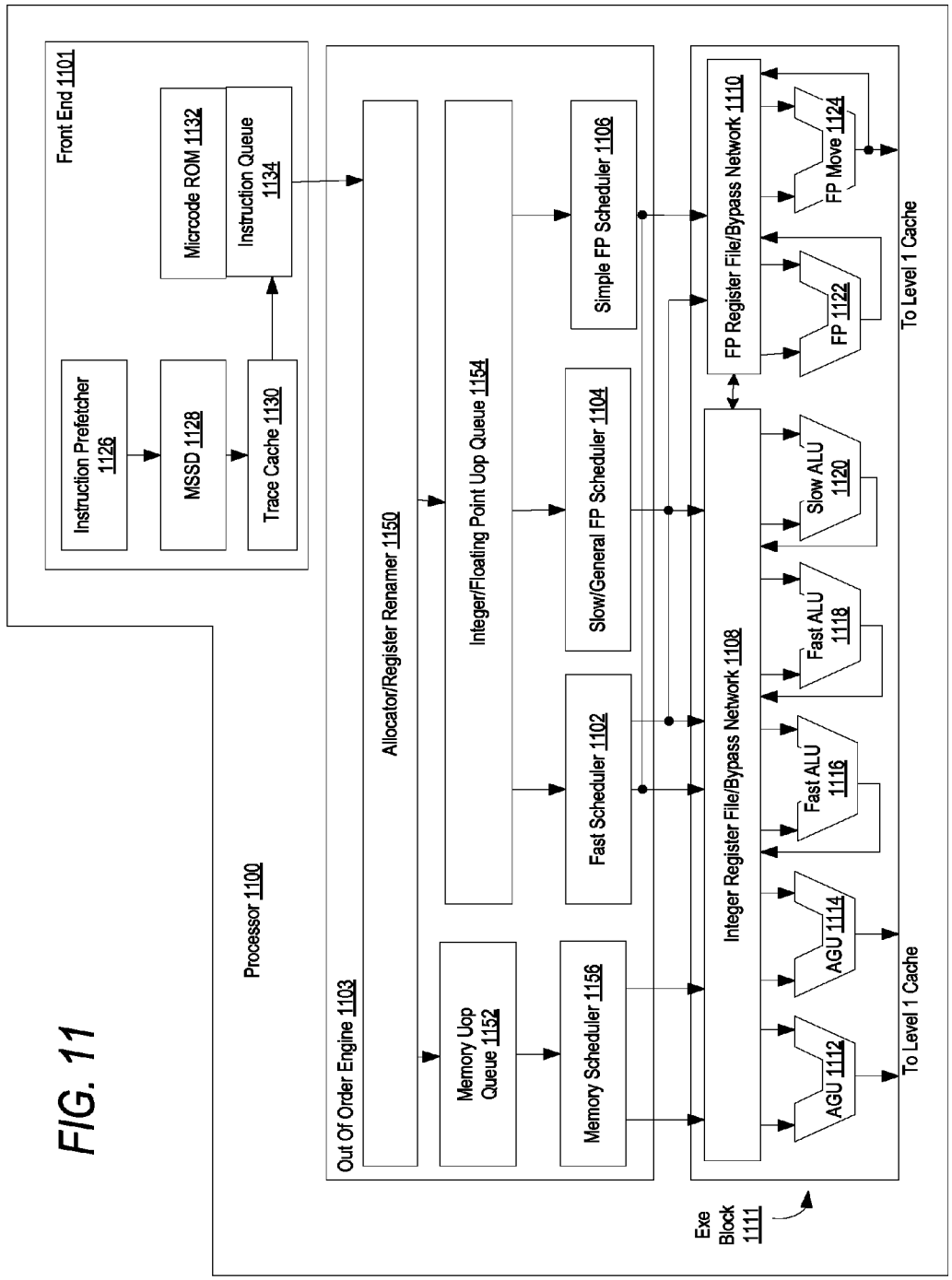
FIG. 11 is a block diagram of the micro-architecture for a processor that includes logic circuits to perform instructions in accordance with one embodiment of the present invention.

FIG. 11 is a block diagram of the micro-architecture for a processor 1100 that includes logic circuits to perform instructions in accordance with one embodiment of the present invention. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 1101 is the part of the processor 1100 that fetches instructions to be executed and prepares them to be used later in the processor pipeline. The front end 1101 may include several units. In one embodiment, the instruction prefetcher 1126 fetches instructions from memory and feeds them to an instruction decoder (e.g., MSSD 1128) which in turn decodes or interprets them. For example, in one embodiment, the MSSD 1128 decodes a received instruction into one or more operations called "microinstructions" or "micro-operations" that the machine can execute. In other embodiments, the MSSD 1128 parses the instruction into an opcode and corresponding data and control fields that are used by the micro-architecture to perform operations in accordance with one embodiment. In one embodiment, the trace cache 1130 takes decoded uops and assembles them into program ordered sequences or traces in the instructions queue 1134 for execution. When the trace cache 1130 encounters a complex instruction, the microcode ROM 1132 provides the uops needed to complete the operation.

Some instructions are converted into a single micro-op, whereas others need several micro-ops to complete the full operation. For one embodiment, an instruction can be decoded into one or a small number of micro ops for processing at the instruction decoder 1128. In another embodiment, an instruction can be stored within the microcode ROM 1132 and have a requisite number of micro-ops to accomplish the operation. The trace cache 1130 refers to an array that holds decoded instructions. The trace cache may be larger than an instruction queue. After the microcode ROM 1132 finishes sequencing micro-ops for an instruction, the front end 1101 of the machine resumes fetching micro-ops from the trace cache 1130.

The out-of-order execution engine 1103 is where the instructions are prepared for execution. The out-of-order execution logic has a number of buffers to smooth out and re-order the flow of instructions to optimize performance as they go down the pipeline and get scheduled for execution. The allocator logic of an allocator/register renamer 1150 allocates the machine buffers and resources that each uop uses in order to execute. The register renaming logic of the allocator/register renamer 1150 renames logic registers onto entries in a register file. The allocator also allocates an entry for each uop in one of a memory uop queue 1154 or an integer/floating point uop queue 1154, in front of the instruction schedulers: memory scheduler 1156, fast scheduler 1102, slow/general floating point scheduler 1104, and simple floating point scheduler 1106. The uop schedulers 1156, 1102, 1104, 1106, determine when a uop is ready to execute based on the readiness of their dependent input register operand sources and the availability of the execution resources the uops need to complete their operation. The fast scheduler 1102 of one embodiment can schedule on each half of the main clock cycle while the other schedulers can only schedule once per main processor clock cycle. The schedulers arbitrate for the dispatch ports to schedule uops for execution.

Register files 1108, 1110, sit between the schedulers 1156, 1102, 1104, 1106, and the execution units 1112, 1114, 1116, 1118, 1120, 1122, and 1124 in the execution block 1111. There is a separate register file 1108, 1110, for integer and floating point operations, respectively. Each register file 1108, 1110, of one embodiment also includes a bypass network that can bypass or forward just completed results that have not yet been written into the register file to new dependent uops. The integer register file 1108 and the floating point register file 1110 are also capable of communicating data with the other. For one embodiment, the integer register file 1108 is split into two separate register files, one register file for the low order 32 bits of data and a second register file for the high order 32 bits of data. The floating point register file 1110 of one embodiment has 128 bit wide entries because floating point instructions typically have operands from 64 to 128 bits in width.

The execution block 1111 contains the execution units 1112, 1114, 1116, 1118, 1120, 1122, 1124, where the instructions are actually executed. This section includes the register files 1108, 1110, that store the integer and floating point data operand values that the microinstructions use to execute. The processor 1100 of one embodiment is comprised of a number of execution units: address generation unit (AGU) 1112, AGU 1114, fast ALU 1116, fast ALU 1118, slow ALU 1120, floating point ALU 1122, floating point move unit 1124. For one embodiment, the floating point execution blocks 1122, 1124, execute floating point, MMX, SIMD, and SSE, or other operations. The floating point ALU 1122 of one embodiment includes a 64 bit by 64 bit floating point divider to execute divide, square root, and remainder micro-ops. For embodiments of the present invention, instructions involving a floating point value may be handled with the floating point hardware. In one embodiment, the ALU operations go to the high-speed ALU execution units 1116, 1118. The fast ALUs 1116, 1118, of one embodiment can execute fast operations with an effective latency of half a clock cycle. For one embodiment, most complex integer operations go to the slow ALU 1120 as the slow ALU 1120 includes integer execution hardware for long latency type of operations, such as a multiplier, shifts, flag logic, and branch processing. Memory load/store operations are executed by the AGUs 1112, 1114. For one embodiment, the integer ALUs 1116, 1118, 1120, are described in the context of performing integer operations on 64 bit data operands. In alternative embodiments, the ALUs 1116, 1118, 1120, can be implemented to support a variety of data bits including 16, 32, 128, 256, etc. Similarly, the floating point units 1122, 1124, can be implemented to support a range of operands having bits of various widths. For one embodiment, the floating point units 1122, 1124, can operate on 128 bits wide packed data operands in conjunction with SIMD and multimedia instructions.

In one embodiment, the uops schedulers 1102, 1104, 1106, dispatch dependent operations before the parent load has finished executing. As uops are speculatively scheduled and executed in processor 1100, the processor 1100 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations are replayed in an embodiment, and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia single instruction, multiple data (SIMD) registers for packed data. For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and streaming SIMD extensions (SSE) instructions. Similarly, 128 bits wide MMX registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Embodiments may be implemented in code and may be stored on a storage medium having stored thereon instructions which can be used to program a system to perform the instructions. The storage medium may include, but is not limited to, any type of non-transitory storage medium such as disk including floppy disks, optical disks, hard disks/magnetic disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments. Example 1 is a processor having a microcode storage comprising a plurality of microcode flows and a decode logic coupled to the microcode storage. The decode logic is configured to receive a first instruction, decode the first instruction into an entry point vector to a first microcode flow in the microcode storage, the entry point vector comprising a first indicator specifying a number of clock cycles associated with the first microcode flow, initiate the microcode storage, wherein the microcode storage inserts microinstructions of the first microcode flow into an instruction queue, count clock cycles after initiating the microcode storage, and decode a second instruction without first receiving a return from the microcode storage, wherein the second instruction is decoded at a particular clock cycle based on the number of clock cycles associated with the first microcode flow.

In example 2, the first indicator further indicates that the first microcode flow satisfies one or more looping criteria for inclusion of the microinstructions for the first microcode flow in a loop of microinstructions. In example 3, the processor of example 2 further includes a loop streaming detector (LSD) configured to: detect a particular loop of microinstructions that comprises at least the microinstructions of the first microcode flow; and repeatedly sequence the particular loop of microinstructions until a loop exit criterion is satisfied. In example 4, repeatedly sequencing the particular loop of microinstructions comprises: generating a first pointer to a head of the particular loop of microinstructions and a second pointer to a tail of the particular loop of microinstructions; detecting that a first microinstruction at the tail of the particular loop has been sequenced using the second pointer; and subsequently jumping from the tail of the particular loop to the head of the particular loop using the first pointer.

In example 5, the processor of any one of examples 3 or 4, further includes additional logic configured to disable one or more components of an instruction pipeline upstream of the instruction queue while the particular loop of microinstructions is sequenced from the instruction queue. Example 6 extends any one of examples 3 to 5. In example 6, the LSD is further configured to: determine that a first size of the instruction queue is at least twice as large as a second size of the particular loop of microinstructions; and insert at least two iterations of the particular loop of microinstructions into the instruction queue. Example 7 extends any one of examples 3 to 6. In example 7, the second instruction is decoded into a second entry point vector to a second microcode flow in the microcode storage, the second entry point vector comprising a second indicator specifying that the second microcode flow fails to satisfy the one or more looping criteria, and wherein the LSD is further configured to: reset a logic state responsive to decoding the second instruction.

Example 8 extends any one of examples 2 to 7. In example 8, the one or more looping criteria comprise a clock cycle threshold that is satisfied by microcode flows that use fewer clock cycles than the clock cycle threshold. Example 9 extends any one of examples 2 to 8. In example 9, the one or more looping criteria comprise an invariance criterion that is satisfied by microcode flows that have an invariant number of clock cycles.

Example 10 is a method comprising receiving a first instruction by a decode logic of a processor. The method further includes decoding, by the decode logic, the first instruction into an entry point vector to a first microcode flow in a microcode storage, the entry point vector comprising a first indicator specifying a number of clock cycles associated with the first microcode flow. The method further includes initiating the microcode storage, wherein the microcode storage inserts microinstructions of the first microcode flow into an instruction queue. The method further includes counting clock cycles after initiating the microcode storage; and decoding, by the decode logic, a second instruction without first receiving a return from the microcode storage, wherein the second instruction is decoded at a particular clock cycle based on the number of clock cycles associated with the first microcode flow. In example 11, the first indicator further indicates that the first microcode flow satisfies one or more looping criteria for inclusion of the microinstructions for the first microcode flow in a loop of microinstructions.

In example 12, the method of example 11 further includes detecting a particular loop of microinstructions that comprises at least the microinstructions of the first microcode flow; and repeatedly sequencing the particular loop of microinstructions until a loop exit criterion is satisfied. In example 13, the repeatedly sequencing the particular loop of microinstructions comprises of example 12, includes generating a first pointer to a head of the particular loop of microinstructions and a second pointer to a tail of the particular loop of microinstructions; detecting that a first microinstruction at the tail of the particular loop has been sequenced using the second pointer; and subsequently jumping from the tail of the particular loop to the head of the particular loop using the first pointer.

Example 14 extends any one of examples 12 to 13. In example 14 the method further comprising disabling one or more components of an instruction pipeline upstream of the instruction queue while the particular loop of microinstructions is sequenced from the instruction queue. Example 15 extends any one of examples 12 to 14. In example 15, the method includes determining that a first size of the instruction queue is at least twice as large as a second size of the particular loop of microinstructions; and inserting at least two iterations of the particular loop of microinstructions into the instruction queue.

Example 16 extends any one of examples 11 to 15. In example 16, the second instruction is decoded into a second entry point vector to a second microcode flow in the microcode storage, the second entry point vector comprising a second indicator specifying that the second microcode flow fails to satisfy the one or more looping criteria, the method further comprising: resetting a loop streaming detector responsive to decoding the second instruction.

Example 17 extends any one of examples 11 to 16. In example 17, the one or more looping criteria comprise a clock cycle threshold that is satisfied by microcode flows that use fewer clock cycles than the clock cycle threshold. Example 18 extends any one of examples 11 to 17. In example 18, the one or more looping criteria comprise an invariance criterion that is satisfied by microcode flows that have an invariant number of clock cycles. Example 19 provides an apparatus comprising means for performing the method of any one of examples 10 to 18. Example 20 provides an apparatus comprising a processor configured to perform the method of any one of examples 10 to 18.

In example 21 a computing device includes a memory and a processor coupled to the memory. The processor has a decode logic configured to: receive a first instruction; decode the first instruction into an entry point vector to a first microcode flow in a microcode storage, the entry point vector comprising a first indicator specifying a number of clock cycles associated with the first microcode flow and indicating that the first microcode flow satisfies one or more looping criteria for inclusion of microinstructions for the first microcode flow in a loop of microinstructions; initiate the microcode storage, wherein the microcode storage inserts the microinstructions of the first microcode flow into an instruction queue; count clock cycles after initiating the microcode storage; and decode a second instruction without first receiving a return from the microcode storage, wherein the second instruction is decoded at a particular clock cycle based on the number of clock cycles associated with the first microcode flow.

In example 22, the processor of the computing device of example 21 includes a loop streaming detector (LSD) configured to detect a particular loop of microinstructions that comprises at least the microinstructions of the first microcode flow; and repeatedly sequence the particular loop of microinstructions until a loop exit criterion is satisfied. In example 23, the processor of the computing device of example 22 further comprises additional logic configured to disable one or more components of an instruction pipeline upstream of the instruction queue while the particular loop of microinstructions is sequenced from the instruction queue. Example 24 extends any one of examples 22 to 23. In example 24, the second instruction is decoded into a second entry point vector to a second microcode flow in the microcode storage, the second entry point vector comprising a second indicator specifying that the second microcode flow fails to satisfy the one or more looping criteria, and wherein the LSD is further configured to reset a logic state responsive to decoding the second instruction.

All optional features of the apparatus described above may also be implemented with respect to the method or process described herein. Specifics in the examples may be used anywhere in one or more embodiments.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A processor comprising:
    a microcode storage comprising a plurality of microcode flows; and
    a decode logic coupled to the microcode storage, the decode logic configured to:
        receive a first instruction;
        decode the first instruction into an entry point vector to a first microcode flow in the microcode storage, the entry point vector comprising a first indicator specifying a number of clock cycles associated with the first microcode flow;
        initiate the microcode storage, wherein the microcode storage inserts microinstructions of the first microcode flow into an instruction queue;
        count clock cycles after initiating the microcode storage; and
        decode a second instruction without first receiving a return from the microcode storage, wherein the second instruction is decoded at a particular clock cycle based on the number of clock cycles associated with the first microcode flow.

2. The processor of claim 1, wherein the first indicator further indicates that the first microcode flow satisfies one or more looping criteria for inclusion of the microinstructions for the first microcode flow in a loop of microinstructions.

3. The processor of claim 2, further comprising:
    a loop streaming detector (LSD) configured to:
        detect a particular loop of microinstructions that comprises at least the microinstructions of the first microcode flow; and
        repeatedly sequence the particular loop of microinstructions until a loop exit criterion is satisfied.

4. The processor of claim 3, wherein repeatedly sequencing the particular loop of microinstructions comprises:
    generating a first pointer to a head of the particular loop of microinstructions and a second pointer to a tail of the particular loop of microinstructions;
    detecting that a first microinstruction at the tail of the particular loop has been sequenced using the second pointer; and
    subsequently jumping from the tail of the particular loop to the head of the particular loop using the first pointer.

5. The processor of claim 3, further comprising additional logic configured to disable one or more components of an instruction pipeline upstream of the instruction queue while the particular loop of microinstructions is sequenced from the instruction queue.

6. The processor of claim 3, wherein the LSD is further configured to:
   determine that a first size of the instruction queue is at least twice as large as a second size of the particular loop of microinstructions; and
   insert at least two iterations of the particular loop of microinstructions into the instruction queue.

7. The processor of claim 3, wherein the second instruction is decoded into a second entry point vector to a second microcode flow in the microcode storage, the second entry point vector comprising a second indicator specifying that the second microcode flow fails to satisfy the one or more looping criteria, and wherein the LSD is further configured to:
   reset a logic state responsive to decoding the second instruction.

8. The processor of claim 2, wherein the one or more looping criteria comprise a clock cycle threshold that is satisfied by microcode flows that use fewer clock cycles than the clock cycle threshold.

9. The processor of claim 2, wherein the one or more looping criteria comprise an invariance criterion that is satisfied by microcode flows that have an invariant number of clock cycles.

10. A method comprising:
    receiving a first instruction by a decode logic of a processor;
    decoding, by the decode logic, the first instruction into an entry point vector to a first microcode flow in a microcode storage, the entry point vector comprising a first indicator specifying a number of clock cycles associated with the first microcode flow;
    initiating the microcode storage, wherein the microcode storage inserts microinstructions of the first microcode flow into an instruction queue;
    counting clock cycles after initiating the microcode storage; and
    decoding, by the decode logic, a second instruction without first receiving a return from the microcode storage, wherein the second instruction is decoded at a particular clock cycle based on the number of clock cycles associated with the first microcode flow.

11. The method of claim 10, wherein the first indicator further indicates that the first microcode flow satisfies one or more looping criteria for inclusion of the microinstructions for the first microcode flow in a loop of microinstructions.

12. The method of claim 11, further comprising:
    detecting a particular loop of microinstructions that comprises at least the microinstructions of the first microcode flow; and
    repeatedly sequencing the particular loop of microinstructions until a loop exit criterion is satisfied.

13. The method of claim 12, wherein repeatedly sequencing the particular loop of microinstructions comprises:
    generating a first pointer to a head of the particular loop of microinstructions and a second pointer to a tail of the particular loop of microinstructions;
    detecting that a first microinstruction at the tail of the particular loop has been sequenced using the second pointer; and
    subsequently jumping from the tail of the particular loop to the head of the particular loop using the first pointer.

14. The method of claim 12, further comprising disabling one or more components of an instruction pipeline upstream of the instruction queue while the particular loop of microinstructions is sequenced from the instruction queue.

15. The method of claim 12, further comprising:
    determining that a first size of the instruction queue is at least twice as large as a second size of the particular loop of microinstructions; and
    inserting at least two iterations of the particular loop of microinstructions into the instruction queue.

16. The method of claim 11, wherein the second instruction is decoded into a second entry point vector to a second microcode flow in the microcode storage, the second entry point vector comprising a second indicator specifying that the second microcode flow fails to satisfy the one or more looping criteria, the method further comprising:
    resetting a loop streaming detector responsive to decoding the second instruction.

17. The method of claim 11, wherein the one or more looping criteria comprise a clock cycle threshold that is satisfied by microcode flows that use fewer clock cycles than the clock cycle threshold.

18. The method of claim 11, wherein the one or more looping criteria comprise an invariance criterion that is satisfied by microcode flows that have an invariant number of clock cycles.

19. A computing device comprising:
    a memory; and
    a processor coupled to the memory, the processor having a decode logic configured to:
    receive a first instruction;
    decode the first instruction into an entry point vector to a first microcode flow in a microcode storage, the entry point vector comprising a first indicator specifying a number of clock cycles associated with the first microcode flow and indicating that the first microcode flow satisfies one or more looping criteria for inclusion of microinstructions for the first microcode flow in a loop of microinstructions;
    initiate the microcode storage, wherein the microcode storage inserts the microinstructions of the first microcode flow into an instruction queue;
    count clock cycles after initiating the microcode storage; and
    decode a second instruction without first receiving a return from the microcode storage, wherein the second instruction is decoded at a particular clock cycle based on the number of clock cycles associated with the first microcode flow.

20. The computing device of claim 19, wherein the processor further comprises a loop streaming detector (LSD) configured to:
    detect a particular loop of microinstructions that comprises at least the microinstructions of the first microcode flow; and
    repeatedly sequence the particular loop of microinstructions until a loop exit criterion is satisfied.

* * * * *